US012656523B2

(12) United States Patent
Anderson et al.

(10) Patent No.: US 12,656,523 B2
(45) **Date of Patent: *Jun. 16, 2026**

(54) FREQUENCY DOMAIN OPPOSED-MODE PHOTOELECTRIC SENSOR

(71) Applicant: Banner Engineering Corp.,
Minneapolis, MN (US)

(72) Inventors: David S. Anderson, Plymouth, MN
(US); Jeff Bromen, Minneapolis, MN
(US); Ashley Wise, Plymouth, MN
(US)

(73) Assignee: Banner Engineering Corp.,
Minneapolis, MN (US)

( * ) Notice: Subject to any disclaimer, the term of this
patent is extended or adjusted under 35
U.S.C. 154(b) by 224 days.

This patent is subject to a terminal dis-
claimer.

(21) Appl. No.: 18/501,384

(22) Filed: Nov. 3, 2023

(65) Prior Publication Data

US 2024/0061144 A1 Feb. 22, 2024

Related U.S. Application Data

(63) Continuation of application No. 17/452,723, filed on
Oct. 28, 2021, now Pat. No. 11,841,477.

(Continued)

(51) Int. Cl.
*G01V 8/12* (2006.01)
*G08C 23/04* (2006.01)
(52) U.S. Cl.
CPC .............. *G01V 8/12* (2013.01); *G08C 23/04*
(2013.01)
(58) Field of Classification Search
CPC ................................. G01V 8/12; G08C 23/04
See application file for complete search history.

(56) References Cited

U.S. PATENT DOCUMENTS 8,005,539 B2 8/2011 Burnes et al.
8,289,501 B2 10/2012 Addison et al.
(Continued)

OTHER PUBLICATIONS

Banner Engineering Corp, "SM30 and SMI30," Catalog, 2011.
Accessed: Aug. 19, 2021. [Online]. retrieved from the Internet Aug.
19, 2021 Available: https://stevenengineering.com/pdf/04PHOTO_
SM30_SMI30.PDF.

(Continued)

*Primary Examiner* — Kevin K Pyo
(74) *Attorney, Agent, or Firm* — Thompson Patent Law
Offices PC

(57) ABSTRACT

Apparatus and associated methods relate to pairing a
receiver with an emitter based on a presence of an amplitude
of a spectral profile at at least one predetermined frequency.
In an illustrative example, a receiver may receive, from the
emitter, an emitted optical signal modulated by the at least
one predetermined frequency. A receiver may, for example,
generate a digital signal corresponding to the optical signal
received. A controller may, for example, generate the spec-
tral profile from the digital signal. The controller may, for
example, apply a predetermined threshold to the spectral
profile. The controller may, for example, generate an output
signal based on the presence of the amplitude of the spectral
profile above the first predetermined threshold at the at least
one predetermined frequency. Various embodiments may
advantageously discriminate a corresponding emitter to
establish an optical source-to-detector-link, for example, in
the presence of other emitters and/or optically noisy envi-
ronments.

5 Claims, 11 Drawing Sheets

Related U.S. Application Data

(60) Provisional application No. 63/107,311, filed on Oct. 29, 2020.

(56) References Cited

U.S. PATENT DOCUMENTS

| | | | |
|---|---|---|---|
| 9,117,359 B2 | 8/2015 | Hanses et al. | |
| 9,507,049 B2 | 11/2016 | Stecker et al. | |
| 9,880,279 B2 | 1/2018 | Stecker | |
| 10,179,242 B2 | 1/2019 | Cinbis et al. | |
| 10,690,756 B2 * | 6/2020 | Warke | G01S 17/10 |
| 11,067,443 B2 | 7/2021 | Goldring et al. | |
| 2007/0264030 A1 | 11/2007 | Gorrell et al. | |
| 2010/0007352 A1 | 1/2010 | Xie et al. | |
| 2017/0184702 A1 | 6/2017 | Lee et al. | |

OTHER PUBLICATIONS

Banner Engineering Corp, "VALU-BEAM Series Opposed Mode Sensor Pairs," Nov. 2019, retrieved from the internet Aug. 19, 2021 https://info.bannerengineering.com/cs/groups/public/documents/literature/39555.pdf.

Banner Engineering, World-Beam QS18E Clear Object Detection Instruction Manual, Aug. 13, 2018, 9 pages.

In-Situ, Inc., "Aqua TROLL Turbidity Sensor," In-Situ.com, 2020, retrieved from the internet Oct. 12, 2021, https://in-situ.com/us/aqua-troll-turbidity-sensor (accessed Oct. 12, 2021).

J. Gao, L. Shen, L. Gao, and Y. Lu, "A Rapid Accurate Recognition System for Radar Emitter Signals," Electronics, vol. 3, No. 4, Art. No. 4, Apr. 2019, retrieved from the internet Aug. 19, 2021, doi: 10.3390/electronics8040463.

K.-P. Ho and J. M. Kahn, "Methods for crosstalk measurement and reduction in dense WDM systems," J. Lightwave Technol., vol. 14, No. 6, pp. 1127-1135, Jun. 1996, retrieved from the internet Aug. 19, 2021, doi: 10.1109/50.511614.

M. Zhu, Z. Feng, and X. Zhou, "A Novel Data-Driven Specific Emitter Identification Feature Based on Machine Cognition," Electronics, vol. 9, No. 8, Art. No. 8, Aug. 2020, retrieved from the internet Aug. 19, 2021 doi: 10.3390/electronics9081308.

Rockwell Automation, "45LSP Optical Fork PHOTOSWITCH Photoelectric Sensors Installation Instructions," Spec Sheet 10000033147 Ver 02, Nov. 2015, retrieved from the internet Oct. 12, 2021 https://literature.rockwellautomation.com/idc/groups/literature/documents/in/45lsp-in001_-en-p.pdf.

S. D'Agostino, G. Foglia, and D. Pistoia, "Specific Emitter Identification: Analysis on real radar signal data," Nov. 2009, pp. 242-245, retrieved from the internet Aug. 19, 2021, https://www.researchgate.net/publication/224611353.

Y. Su-Xin, L. Shu-Jun, W. Shi-Lian, and Z. Wei, "Modified communication emitter recognition method based on D-S theory," in 2015 IEEE International Conference on Signal Processing, Communications and Computing (ICSPCC), Sep. 2015, pp. 1-4, retrieved from the internet Aug. 19, 2021, doi: 10.1109/ICSPCC.2015.7338953.

Z. Yang, W. Qiu, H. Sun, and A. Nallanathan, "Robust Radar Emitter Recognition Based on the Three-Dimensional Distribution Feature and Transfer Learning," Sensors, vol. 16, No. 3, Art. No. 3, Mar. 2016, retrieved from the internet Aug. 19, 2021, doi: 10.3390/s16030289.

* cited by examiner

505

510

605

610

FREQUENCY DOMAIN OPPOSED-MODE PHOTOELECTRIC SENSOR

CROSS-REFERENCE TO RELATED APPLICATIONS

This application is a continuation and claims the benefit of U.S. application Ser. No. 17/452,723, titled "Frequency Domain Opposed-mode Photoelectric Sensor," filed by David S. Anderson, et al., on Oct. 28, 2021, which claims the benefit of U.S. Provisional Application Ser. No. 63/107,311 filed by David S. Anderson, et al., on Oct. 29, 2020.

This application incorporates the entire contents of the foregoing application(s) herein by reference.

The subject matter of this application may have common inventorship with and/or may be related to the subject matter of the following:

U.S. application Ser. No. 17/036,255, titled "Near Range Radar," filed by Ashley Wise, et al., on Sep. 29, 2020;

U.S. Application Ser. No. 62/924,025, titled "Near Range Radar," filed by Ashley Wise, et al., on Oct. 21, 2019;

U.S. Application Ser. No. 63/261,317, titled "Time of Flight Detection Systems with Efficient Phase Measurement," filed by Ashley Wise on Sep. 17, 2021;

U.S. application Ser. No. 14/150,977, titled "Object Sensing Using Dynamic Threshold Hysteresis," filed by John Alyn Stecker on Jan. 9, 2014 and issued as U.S. Pat. No. 9,880,279; and U.S. application Ser. No. 14/045,985, titled "Object Sensing Using Dynamic Demodulation," filed by John Alyn Stecker, et al., on Oct. 4, 2013 and issued as U.S. Pat. No. 9,507,049.

This application incorporates the entire contents of the foregoing application(s) herein by reference.

TECHNICAL FIELD

Various embodiments relate generally to photoelectric emitter and receiver devices.

BACKGROUND

Opposed mode sensors may represent a two-piece sensing system consisting of an emitter and receiver device contained in separate housings. The emitter may contain a light-emitting element such as, by way of example and not limitation, a laser or light-emitting diode (LED). The receiver may contain a photoelectric sensing element such as, by way of example and not limitation, a photodiode or phototransistor that converts received light energy into an electrical current or voltage. This current/voltage may then be analyzed to identify whether light from an emitter is reaching the receiver. The presence or absence of the emitter may be used, for example, to determine whether an object is located between the emitter and receiver. This information, for example, may in turn be used to drive a discrete or analog output, or may be transmitted through some digital communications interface.

SUMMARY

Apparatus and associated methods relate to pairing a receiver with an emitter based on a presence of an amplitude of a spectral profile at at least one predetermined frequency. In an illustrative example, a receiver may receive, from the emitter, an emitted optical signal modulated by the at least one predetermined frequency. A receiver may, for example, generate a digital signal corresponding to the optical signal received. A controller may, for example, generate the spectral profile from the digital signal. The controller may, for example, apply a predetermined threshold to the spectral profile. The controller may, for example, generate an output signal based on the presence of the amplitude of the spectral profile above the first predetermined threshold at the at least one predetermined frequency. Various embodiments may advantageously discriminate a corresponding emitter to establish an optical source-to-detector-link, for example, in the presence of other emitters and/or optically noisy environments.

Various embodiments may achieve one or more advantages. For example, some embodiments may advantageously implement digital signal processing (DSP) methods to accurately identify an emitter of interest in the presence of interference and/or noise. Frequency analysis may advantageously allow a receiver, for example, to differentiate between received light from a paired emitter, and other sources of interfering light (e.g., other emitters or ambient light). In various embodiments, sensor pairs may, by way of example and not limitation, advantageously reject a received signal(s) of neighboring emitter(s) and identify the signal of a paired emitter. In some embodiments, a paired sensor may, for example, advantageously reject crosstalk signal(s) from a neighboring non-paired emitter(s).

Some embodiments requiring the presence of both frequencies in the returned signal, a sensor pair may advantageously differentiate between an intended emitter signal and a source of interfering noise at any single frequency. In various embodiments, a sub frequency may be chosen, for example, to not be a harmonic of a main frequency. Such embodiments may, for example, advantageously enhance noise signal discrimination. A sensor pair may, for example, advantageously reject environmental noise by the use of predetermined dual drive frequencies by the emitter.

In various embodiments, a noise signal may be advantageously rejected and a 'false positive' be avoided even in the presence of strong noise at one or more intended frequencies.

Various embodiments may, for example, advantageously analyze spectral energy and automatically adjust at least one threshold due, for example, to a dirty signal, or lower at least one threshold, for example, if a received signal is clean. Such embodiments may, for example, advantageously adjust one or more thresholds in response to change in environmental noise.

In various embodiments, one or more paired sensor sets may, for example, advantageously set an output indicating whether an emitter signal is detected or not, even when used in optically noisy environments.

Various embodiments may, for example, be used after a teaching mode is completed to advantageously track slow deviations over time, while ignoring anomalies that occur quickly and less often and focusing on changes that may occur in the emitter signal. Various embodiments may, for example, advantageously assist to reject low frequency noise source(s) that alias to higher frequencies.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE
EMBODIMENTS

To aid understanding, this document is organized as follows. First, to help introduce discussion of various embodiments, a frequency domain opposed mode photoelectric system is introduced with reference to FIGS. 1-2B. Second, that introduction leads into a description with reference to FIGS. 3-9 of some exemplary embodiments of frequency domain sensor identification. Third, with reference to FIG. 10, an exemplary method is described in application to exemplary frequency domain sensor identification. Finally, the document discusses further embodiments, exemplary applications and aspects relating to frequency domain opposed mode photoelectric systems and methods.

Figure 1:
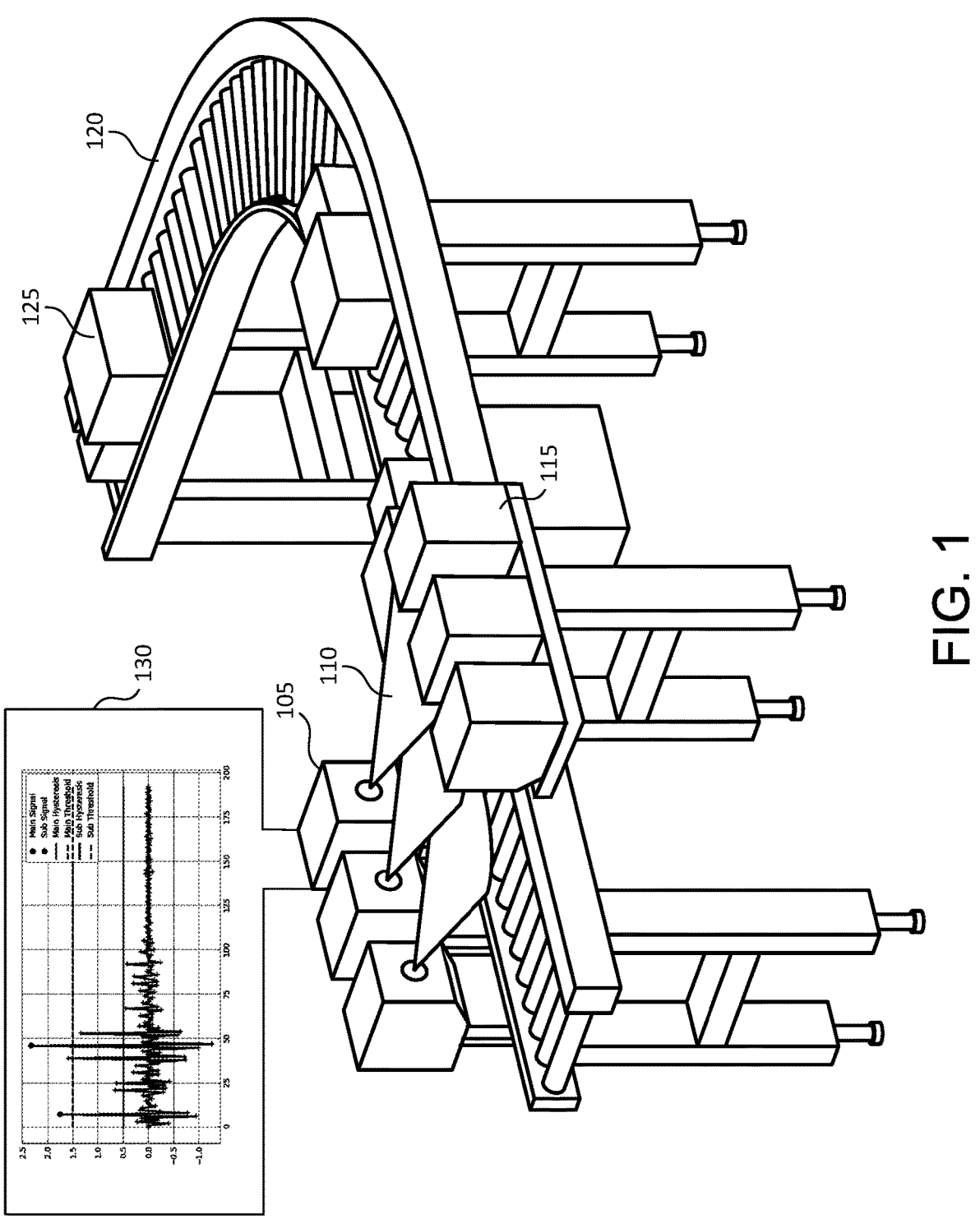
FIG. 1 depicts exemplary self-identifying frequency domain opposed-mode photoelectric sensors employed in an illustrative use-case scenario.

FIG. 1 depicts exemplary self-identifying frequency domain opposed-mode photoelectric sensors employed in an illustrative use-case scenario. Three pairs of self-identifying frequency domain opposed-mode photoelectric (SIFDOMP) sensors are mounted to a conveyor 120. Each sensor pair is made up of a matched emitter 105 and receiver 115. Each emitter 105 is configured to emit a respective optical signal 110. Conveyor 120 is conveying objects 125 past the sensor pairs. By way of example and not limitation, the sensor pairs may be configured to detect one or more objects 125 by interrupting at least one signal 110 between an emitter 105 and receiver 115. The sensors may, by way of example and not limitation, be configured to detect baggage, jam detection on the conveyor, triggering printing on or application to the objects, counting objects on the conveyor, size detection, object presence detection, inspection for missing objects or components of the objects, or other suitable applications. In various embodiments, the SIFDOMP sensors may be implemented other than conveyors such as, by way of example and not limitation, to detect object presence (e.g., of pallets).

Performance metrics of an opposed mode sensor may relate to both an ability to accurately identify the presence of an emitter, and to not falsely identify the presence of an emitter due to other noise sources in the environment (e.g., room light or a nearby unrelated emitter). By way of example and not limitation, characteristics that may challenge accurate opposed mode sensor identification include: a received signal that is low in amplitude due the distance between the emitter and receiver; a receiver that is positioned in close proximity to multiple emitters; and the presence of ambient high efficiency lighting (either LED or fluorescent light).

In various embodiments, a SIFDOMP sensor pair may, for example, advantageously implement digital signal processing (DSP) methods to accurately identify the emitter of interest in the presence of the above characteristics. For example, in the depicted embodiment, an emitter may be configured to emit the light at one or more predetermined frequency. The signal received by the matching paired receive may be further analyzed in the frequency domain (as represented by spectral energy graph 130) to determine if the light represented in the received signal contains the intended emitter light at the one or more predetermined frequency.

Figure 2A:
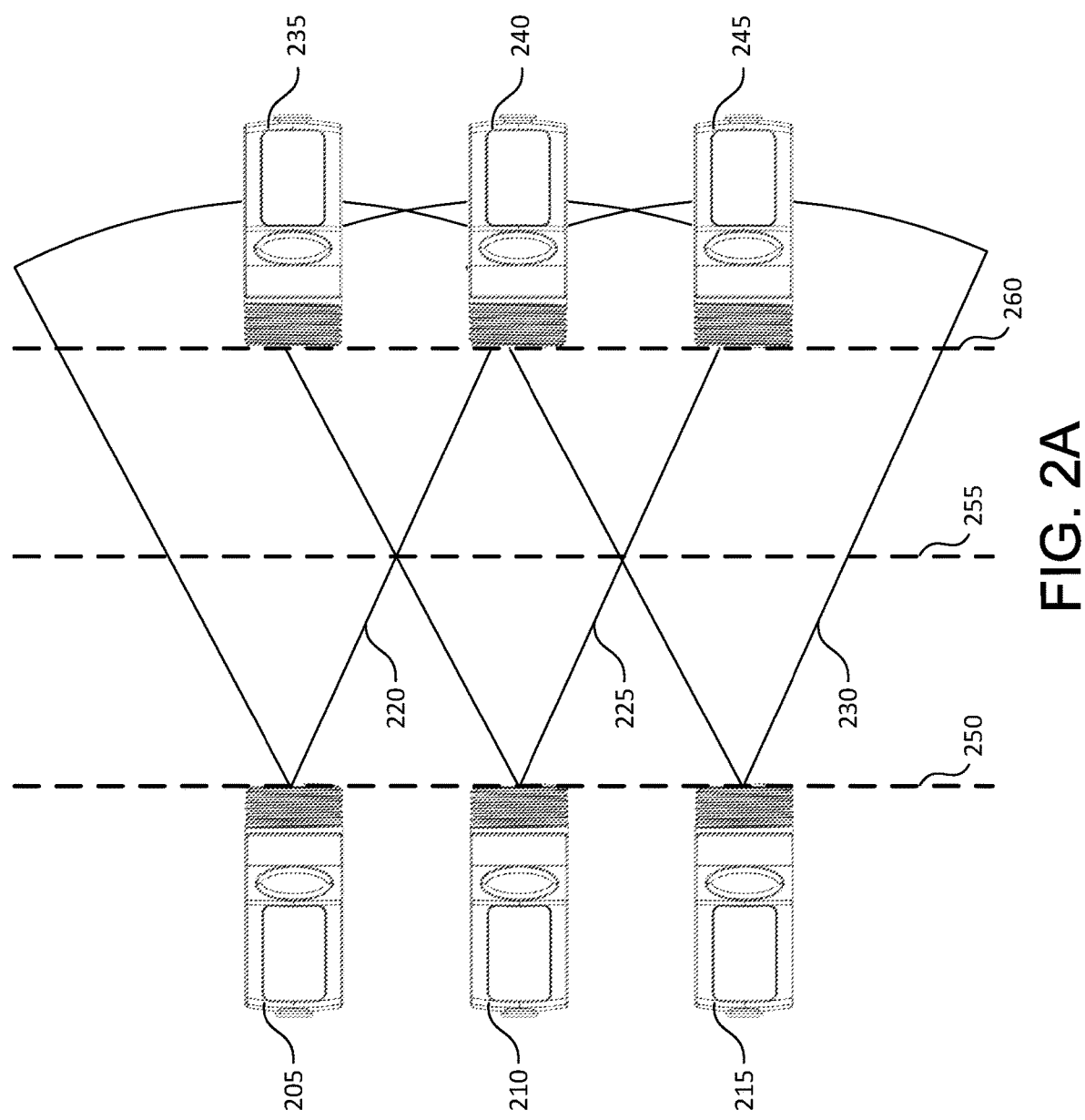
FIG. 2A depicts a top plan view of exemplary self-identifying frequency domain opposed-mode photoelectric sensors employed in an illustrative use-case scenario.

FIG. 2A depicts a top plan view of exemplary self-identifying frequency domain opposed-mode photoelectric sensors employed in an illustrative use-case scenario. Three matched self-identifying frequency domain opposed-mode photoelectric (SIFDOMP) sensor pairs are depicted. Emitters 205, 210, and 215 are paired with receivers 235, 240, and 245, respectively. Emitters 205, 210, and 215 emit optical signals 220, 225, and 230, respectively. In the depicted example, emitters 205-215 are aligned at position 250. The spread of the emitted optical signals 220-230 causes the signals to begin overlapping at position 255, before reaching receivers 235-245 at position 260.

In various embodiments, by way of example and not limitation, a paired emitter may be identified by performing frequency analysis to identify spectral energy present at one or more intended emitter frequency. Frequency analysis may advantageously allow the receiver, for example, to differentiate between the received light from its own (paired) emitter, and other sources of interfering light (e.g., other emitters or ambient light). For example, in the depicted embodiment, neighboring emitters 205, 210, and 215 may be configured to emit optical signals 220, 225, and 230, respectively, at different predetermined drive frequencies. Accordingly, the sensor pairs may, by way of example and not limitation, advantageously reject the received signal of neighboring emitter and identify the signal of the paired emitter. In various such embodiments, because the analysis is performed in the frequency domain, any shift in direct current (DC) signal (e.g., a DC light source or DC offset in sensor electronic circuitry) may be rejected when searching for the emitter. Accordingly, a lower amplitude threshold may be set and so advantageously improve identification of weak intended signals. In some embodiments, an entire evaluation window may be processed, rather than attempting to locate the fixed emitter envelope within the time domain.

Figure 2B:
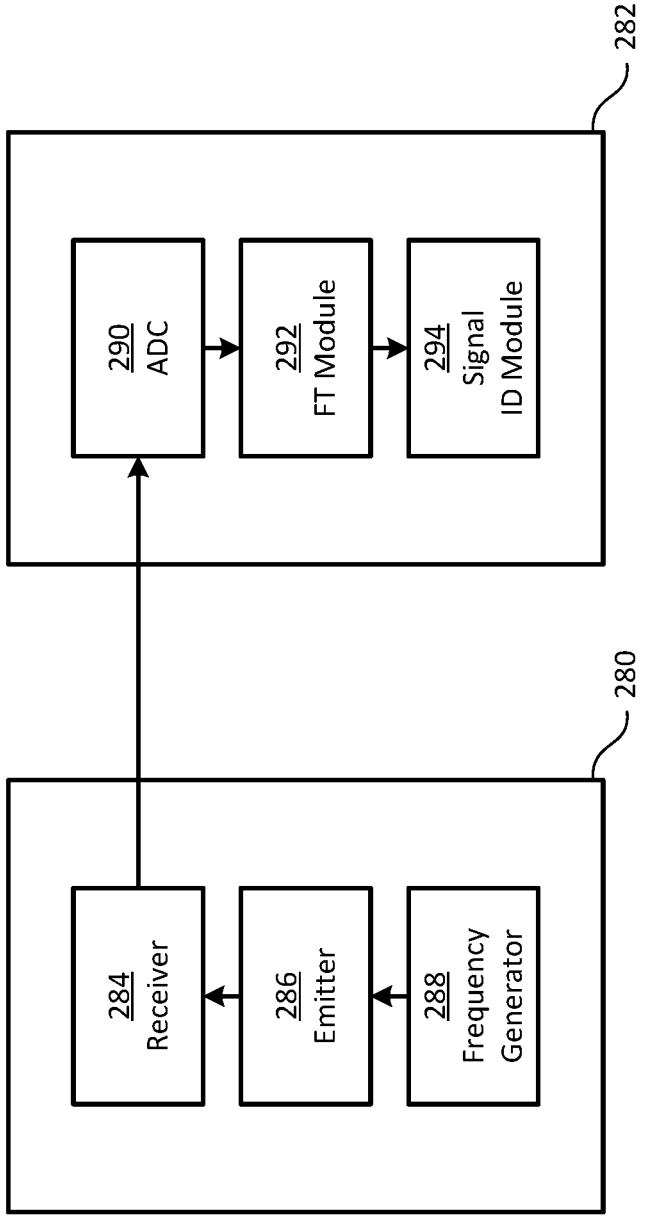
FIG. 2B depicts a block diagram of an exemplary self-identifying frequency domain opposed-mode photoelectric sensor.

FIG. 2B depicts a block diagram of an exemplary self-identifying frequency domain opposed-mode photoelectric sensor. An exemplary sensor hardware 280 includes a frequency generator 288, an emitter 286, and a matching receiver 284. An exemplary analysis circuit 282 includes an analog-digital converter (ADC 290), a Fourier Transform module (FT module 292), and a signal identification module (signal ID module 294). The frequency generator 288 may, for example, be configured to cause the emitter 286 to emit an optical signal at one or more predetermined drive frequencies. The receiver 284 may receive optical signals, including that generated by the emitter 286, and generate therefrom at least one electrical signal. The ADC 290 may convert the received signal from an analog signal to a digital signal. The FT module 292 may convert the received signal into the frequency domain. The signal ID module 294 may perform one or more steps including, by way of example and not limitation, spectral analysis, noise detection, threshold calculation, threshold evaluation, demodulation, other appropriate steps, or some combination thereof.

Figure 3:
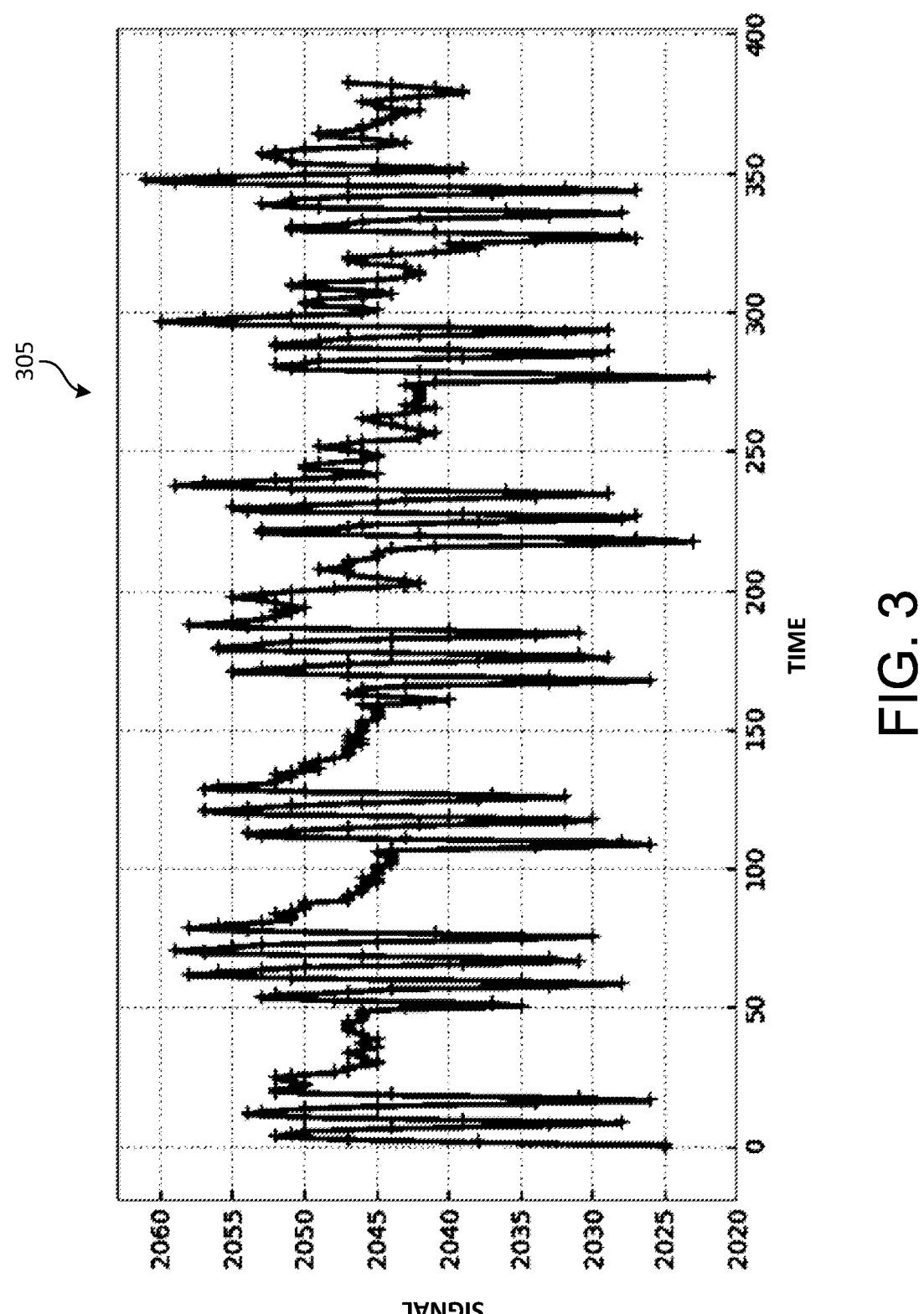
FIG. 3 depicts an illustrative signal received by a receiver of an exemplary self-identifying frequency domain opposed-mode photoelectric sensor from a matching emitter employing multiple drive frequencies.
Figure 4:
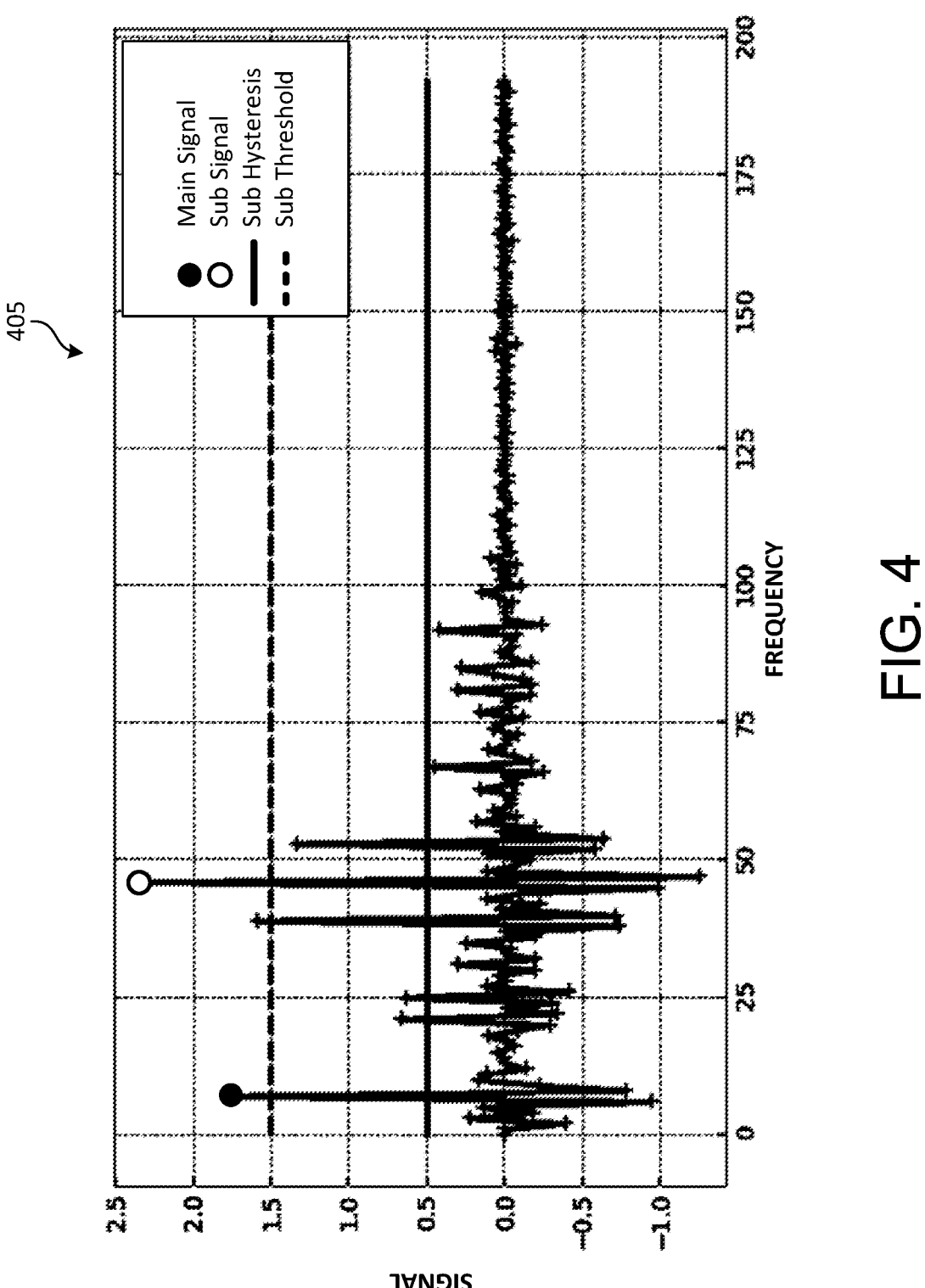
FIG. 4 depicts an illustrative spectral energy plot of the illustrative signal of FIG. 3

FIG. 3 depicts an illustrative signal received by a receiver of an exemplary self-identifying frequency domain opposed-mode photoelectric sensor from a matching emitter employing multiple drive frequencies. FIG. 4 depicts an illustrative spectral energy plot of the illustrative signal of FIG. 3. In embodiments using frequency analysis for emitter identification, it may still be possible for noise that is near the emitter's predetermined drive frequency to be falsely detected as a paired emitter. As an example, a time domain plot 305 of a received pulse train of a receiver where a single emitter is present is shown. The same received signal is shown as frequency domain plot 405 after having been transformed into the frequency domain using a Fast Fourier Transform (FFT) and processed using a Hann windowing function. Multiple peaks (indicating stronger signals at a given frequency) other than the intended two signal frequencies are shown, including at least one of which is above both a sub threshold and a hysteresis threshold, and four of which are above the sub threshold. Accordingly, if the matched emitter generated an optical signal at a single drive frequency, frequency analysis alone may be insufficient to distinguish the matched emitter in the received signal from received noise.

In various embodiments, the matched emitter signal may include components of a plurality of distinct frequencies. A paired emitter in the depicted example contains both a low frequency carrier frequency (e.g., in the 10 kHz range, as depicted, which may be referred to as the "main" frequency and shown as the "Main Signal" in plot 405) and a high frequency emitter signal (e.g., in the approximately 100 kHz range, as depicted, which may be referred to as the "sub" frequency or "Sub Signal" in plot 405). For example, this multi-frequency signal may be generated by using the lower carrier frequency as a "gate" to inhibit the emitter from firing the higher frequency signal. By requiring the presence of both frequencies in the returned signal, a SIFDOMP sensor pair may, for example, advantageously differentiate between an intended emitter signal and the source of interfering noise at any single frequency. In various embodiments, the sub frequency may be chosen, for example, to not be a harmonic of the main frequency to, for example, advantageously enhance noise signal discrimination.

Figure 5:
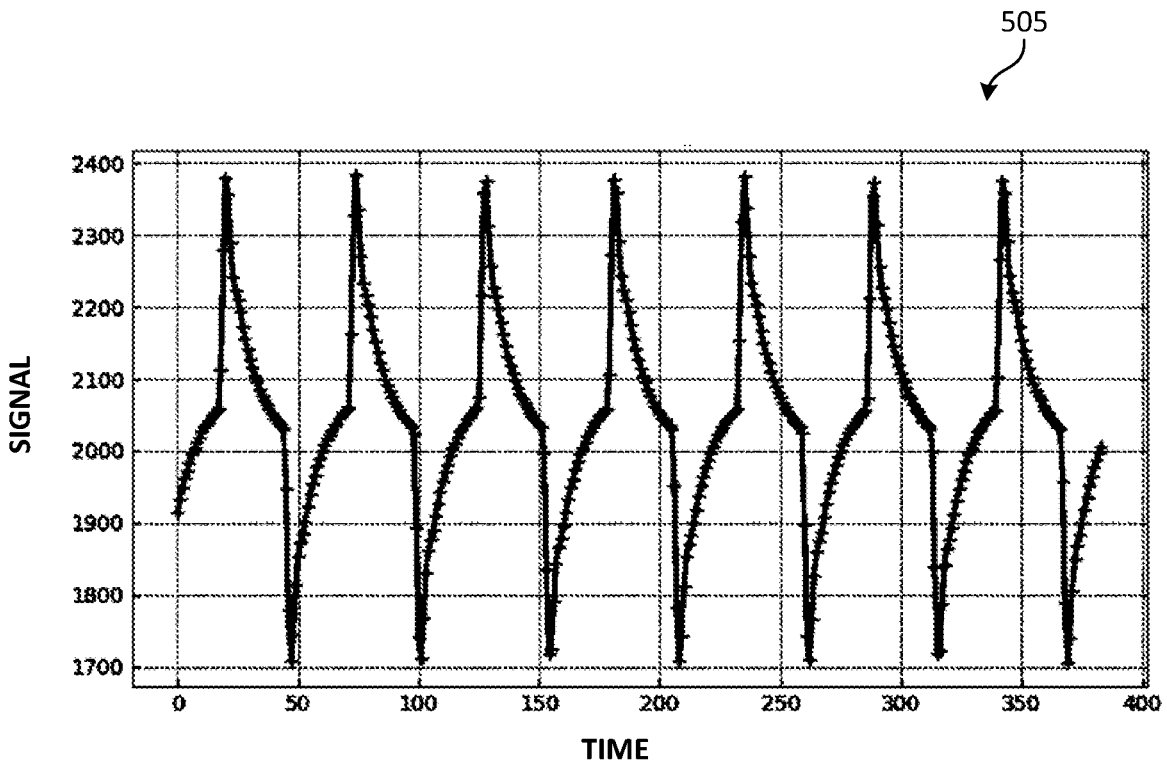
FIG. 5 depicts an illustrative noise signal present at a main emitter frequency in the exemplary sensor of FIG. 3, as well as a resulting spectral energy plot.
Figure 5:
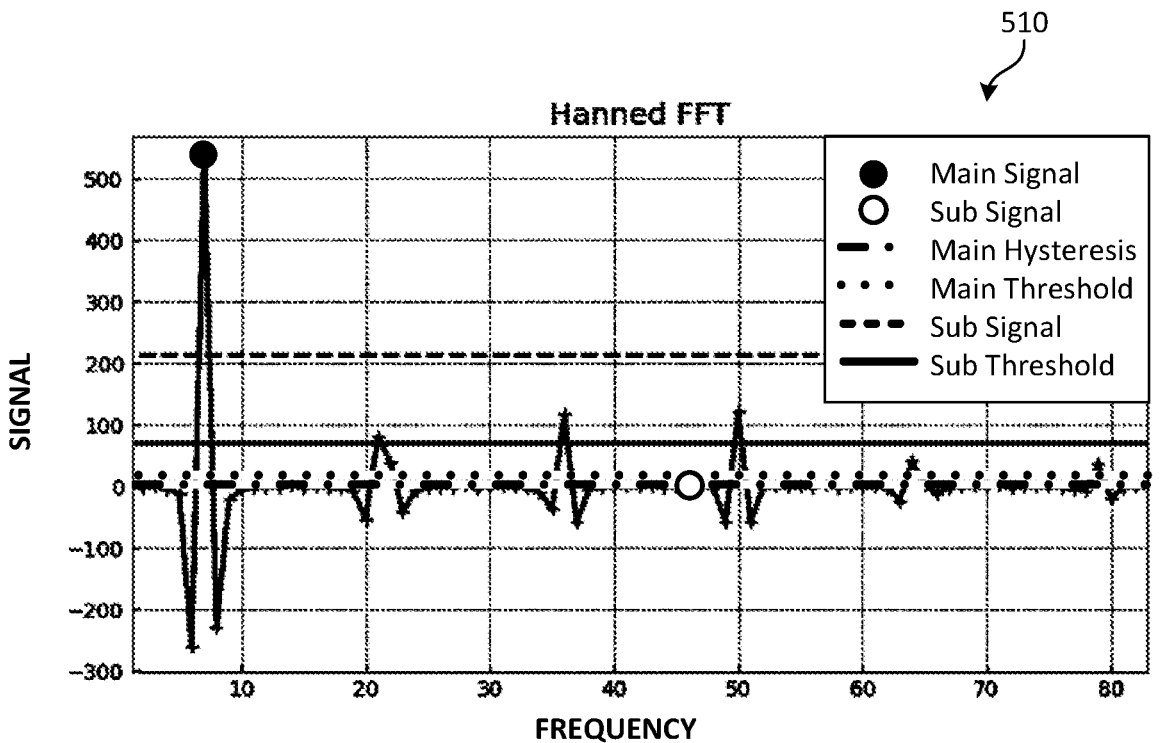

FIG. 5 depicts an illustrative noise signal present at a main emitter frequency in the exemplary sensor of FIG. 3, as well as a resulting spectral energy plot. Plot 505 shows the received noise signal in the time domain, and plot 510 shows the received noise signal in the frequency domain after being processed through a FFT and Hann windowing function. In the depicted signal, the matched emitter is not emitting a signal, so all received signal shown in plot 505 and a frequency domain plot 510 represents noise. As shown in the frequency domain plot 510, the noise signal includes an above-threshold signal at the main emitter frequency, marked as the "Main Signal" on the frequency domain plot 510. However, the paired emitter is not on so, as shown in the frequency domain plot 510, no signal is present at the sub frequency. Accordingly, the noise signal may be advantageously rejected and a 'false positive' be avoided even in the presence of strong noise at one intended frequency. It will be appreciated that more than two frequencies may be advantageously employed in various embodiments.

Figure 6:
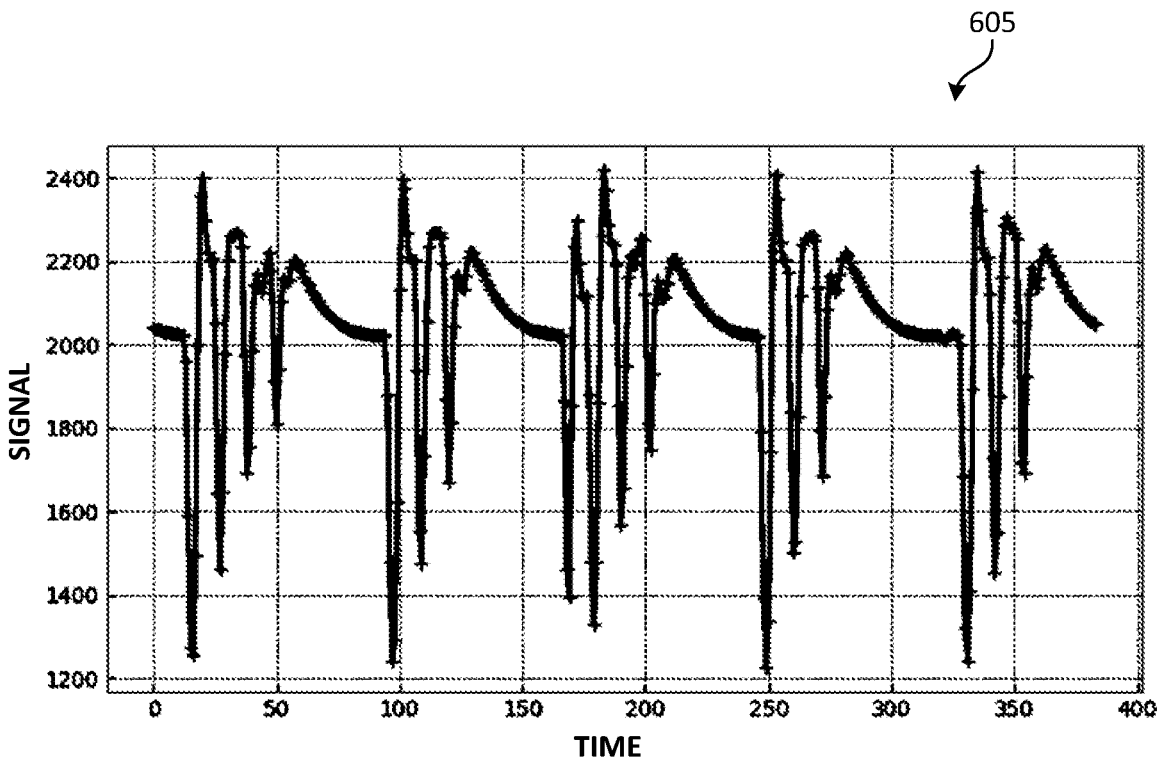
FIG. 6 depicts an illustrative signal received by the receiver of FIG. 3 from at least one non-matching emitter, as well as a resulting spectral energy plot.
Figure 6:
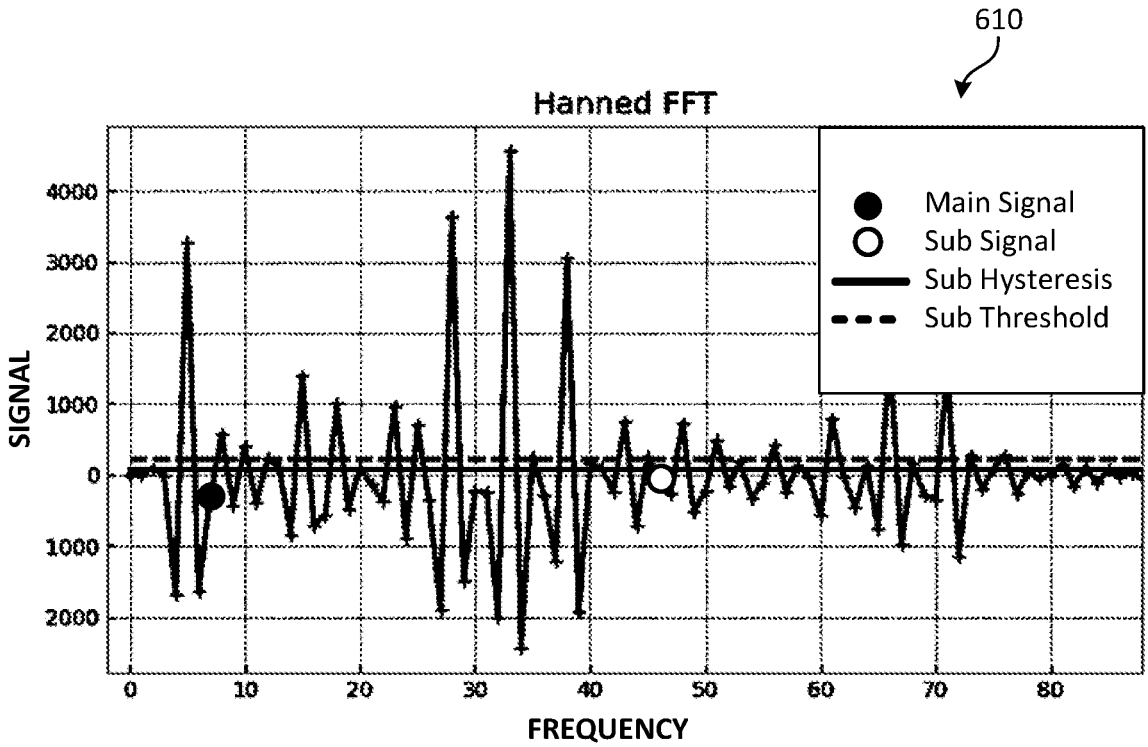

FIG. 6 depicts an illustrative signal received by the receiver of FIG. 3 from at least one non-matching emitter, as well as a resulting spectral energy plot. A plot 605 shows in the time-domain the signal received from the non-matching emitter (e.g., configured to a different frequency), which may be referred to as 'cross-talk.' A plot 610 shows the received crosstalk signal in the frequency domain after being processed through a FFT and Hann windowing function. As shown in the (frequency domain) plot 610 the crosstalk signal is present at different frequencies than the intended paired emitter signal (the paired frequencies are shown as "Main Signal" and "Sub Signal" in the plot 610). Accordingly, the paired sensor may, for example, advantageously reject the crosstalk signal from a neighboring non-paired emitter (such as shown, for example, in FIGS. 1 and 2A).

Figure 7:
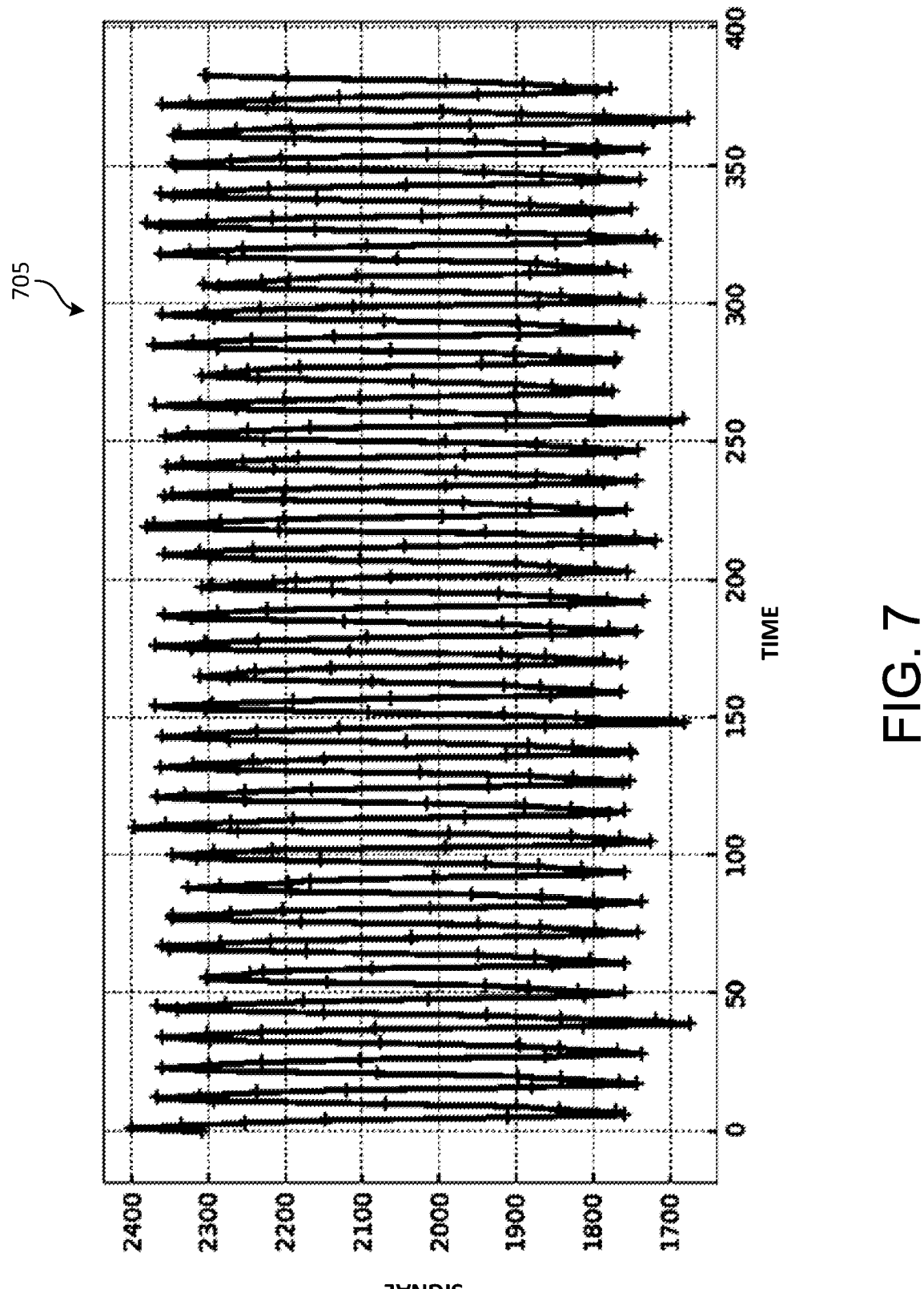
FIG. 7 depicts an illustrative signal received from an emitter by a matching receiver of an exemplary self-identifying frequency domain opposed-mode photoelectric sensor implementing dynamic threshold selection based on computed noise level.
Figure 8:
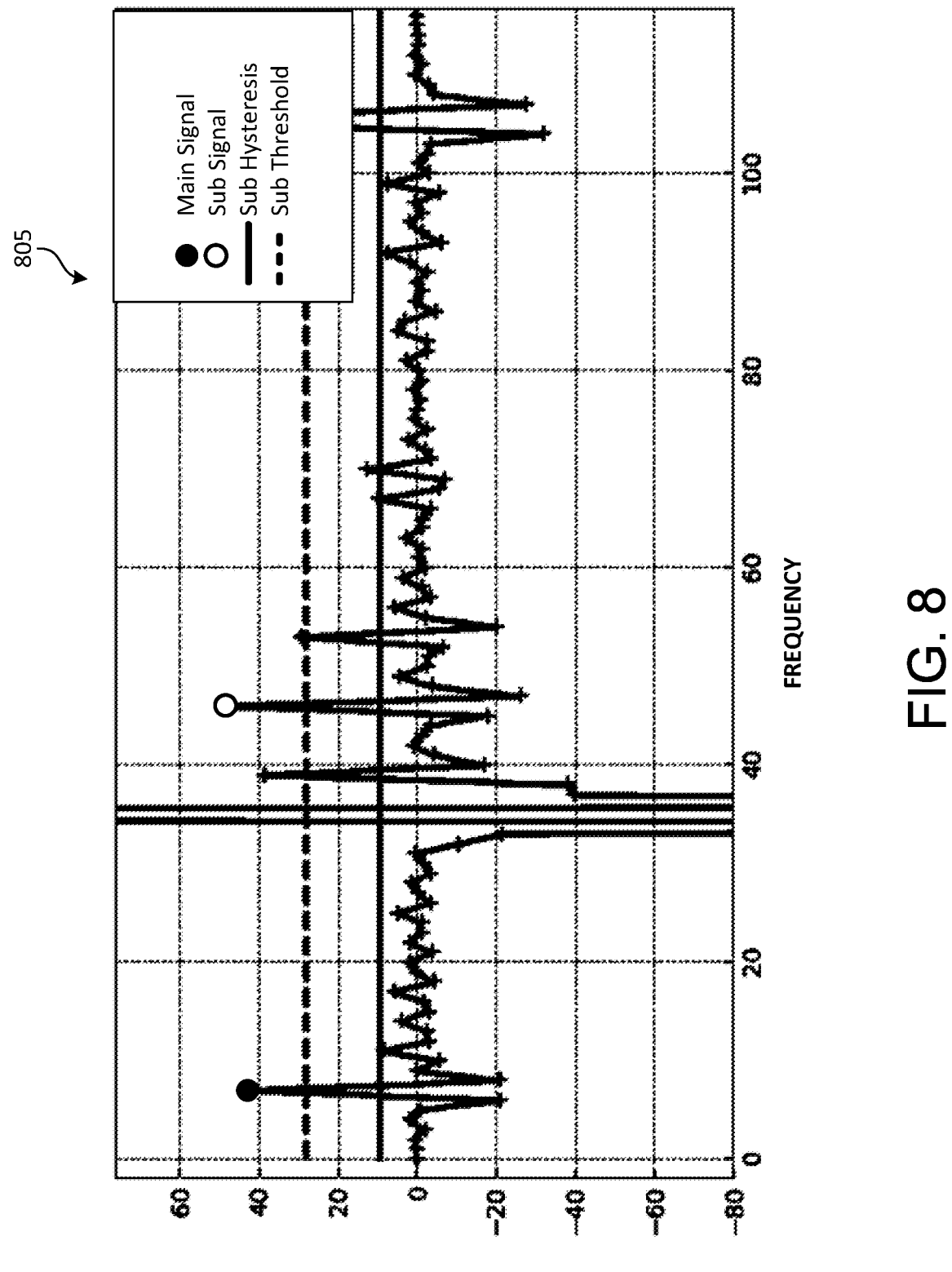
FIG. 8 depicts an illustrative spectral energy plot of the illustrative signal of FIG. 7.
Figure 9:
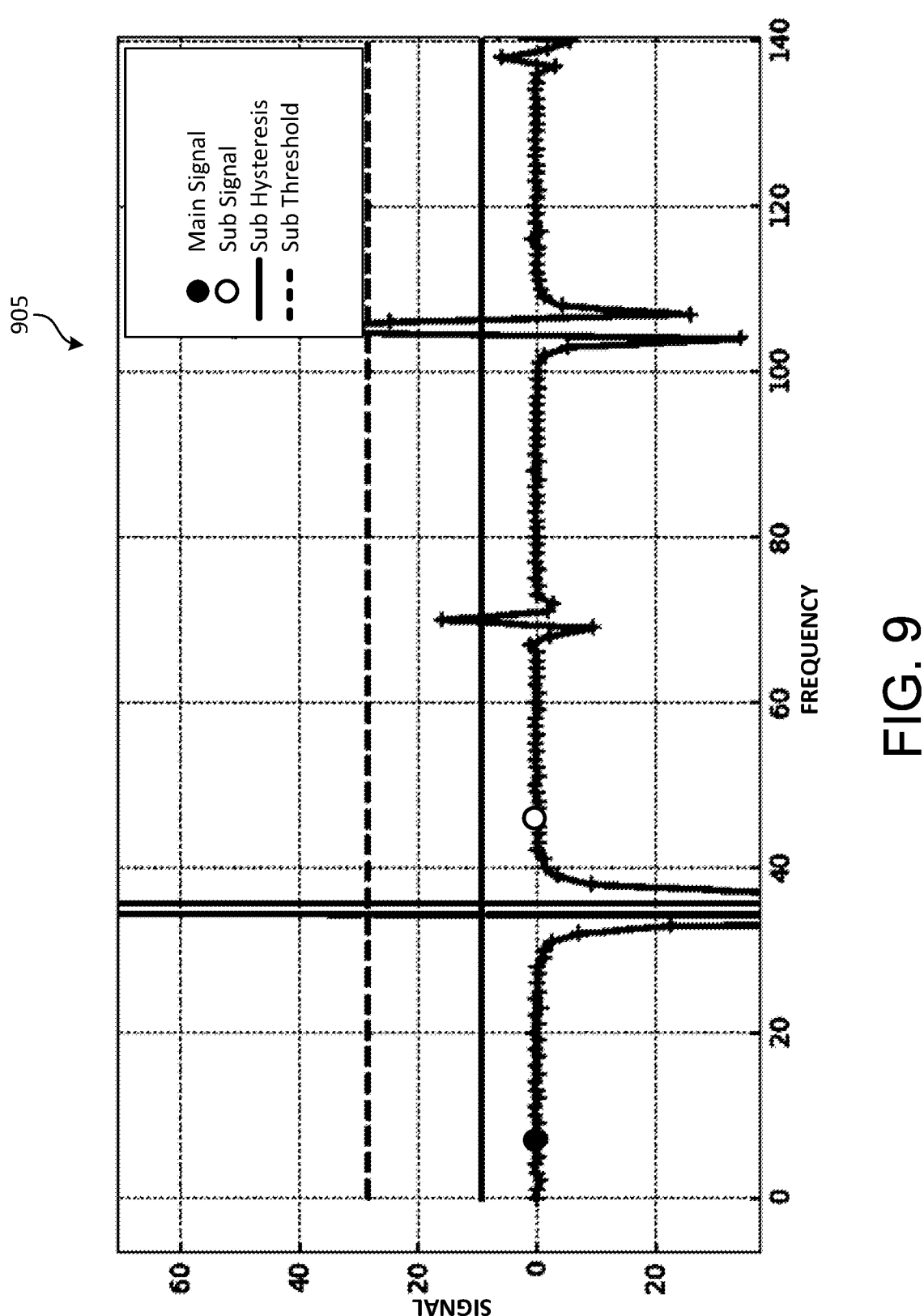
FIG. 9 depicts an illustrative spectral energy plot of an interfering signal received by a matched receiver of the sensor of FIG. 7 when the signal from the matching emitter is not present.

FIG. 7 depicts an illustrative signal received from an emitter by a matching receiver of an exemplary self-identifying frequency domain opposed-mode photoelectric sensor implementing dynamic threshold selection based on computed noise level. FIG. 8 depicts an illustrative spectral energy plot of the illustrative signal of FIG. 7. FIG. 9 depicts an illustrative spectral energy plot of an interfering signal received by a matched receiver of the sensor of FIG. 7 when the signal from the matching emitter is not present. In various use cases, strong signals at one frequency may introduce spectral energy at a different frequency. Accordingly, effective use of a fixed amplitude threshold for paired emitter signal discrimination may be hindered.

In some embodiments, therefore, the total spectral energy in the received waveform may be computed mathematically such as, by way of example and not limitation, using Parseval's theorem. At least one threshold may be thereby dynamically adjusted based on the received noise signal. In some embodiments, one or more methods implemented by thresholding circuits such as are taught in U.S. Pat. No. 9,880,279, issued to John Alyn Stecker on Jan. 30, 2018, the disclosure of which is incorporated herein by reference in its entirety, may be implemented, for example, in digital signal processing circuits.

In such embodiments and other embodiments, a paired sensor may use a mathematical approach to determine the noise level. For example, light level thresholds (e.g., "light" and "dark" thresholds) may be adjusted (e.g., increased). Various embodiments may, for example, advantageously analyze spectral energy and raise at least one threshold due, for example, to a dirty signal, or lower at least one threshold, for example, if the received signal is clean. Accordingly, such embodiments may, for example, advantageously adjust one or more thresholds in response to change in environmental noise.

In an exemplary embodiment, a (time domain) plot 705 shows an exemplary received signal of an intended, paired emitter present, with interfering light much stronger than the intended, paired emitter signal. A (frequency domain) plot 805 shows a frequency analysis of the signal shown in the plot 705. As seen in the plot 805, a dual-frequency emitter signal is capable of identification, as marked by "Main Signal" and "Sub Signal" peaks above the "Sub Threshold." A (frequency domain) plot 905 shows frequency content of the same environment with the emitter signal absent. As can be seen, the interfering signal (above the hysteresis threshold) is still present, but the paired emitter signal is not present (expected frequencies shown by "Main Signal" and "Sub Signal"). Accordingly, the sensor pair may advantageously reject environmental noise by the use of predetermined dual drive frequencies by the emitter.

Figure 10:
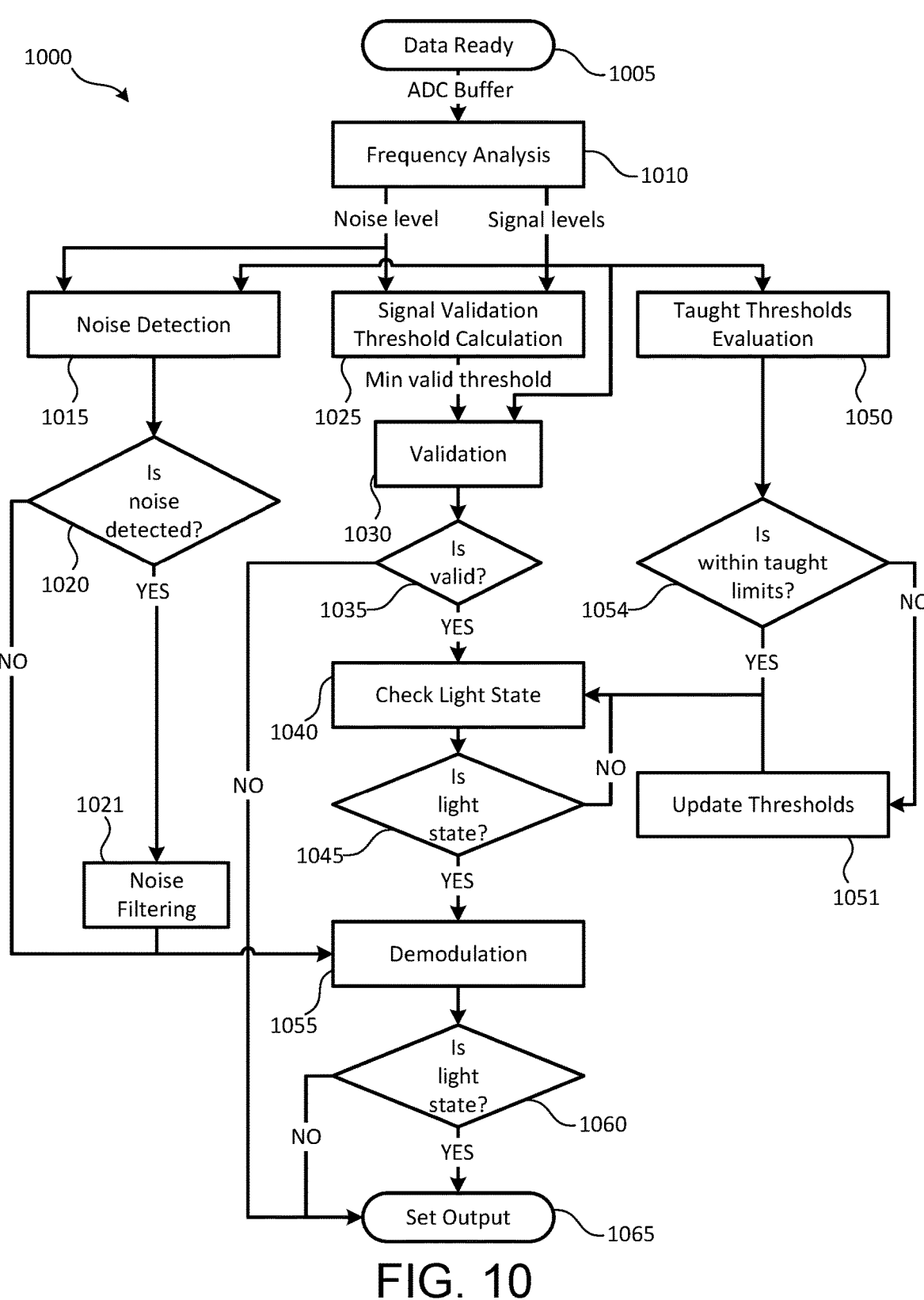
FIG. 10 depicts an exemplary method of frequency domain analysis performed on a received signal(s) in an exemplary self-identifying frequency domain opposed-mode photoelectric sensor.

FIG. 10 depicts an exemplary method of frequency domain analysis performed on a received signal(s) in an exemplary self-identifying frequency domain opposed-mode photoelectric sensor. The method begins with data ready in a step 1005, which may be a signal generated by a receiver of a paired sensor such as shown in FIGS. 1 and 2A. An ADC buffer is provided which may, for example, receive the digital signal from an ADC for frequency analysis. Frequency analysis step 1010 may, by way of example and not limitation, include one or more steps to transform the signal, using one or more suitable frequency domain approaches at one or more frequencies, from a time domain to a frequency domain such as, for example, by digital bandpass filter techniques (e.g., Finite Impulse Response or Infinite Impulse Response), FFT, Goertzel Transform, discrete FT, other appropriate frequency analysis techniques, or some combination thereof. In the depicted example, frequency analysis step 1010 generates outputs including noise level and signal level(s).

Noise level and signal level(s) output from frequency analysis step 1010 are processed by noise detection step 1015. If noise is not detected in a step 1020, noise filtering 1021 occurs before the signal is demodulated in a step 1055. If noise is not detected in the step 1020, the signal is passed to demodulation step 1055. Noise level from frequency analysis step 1010 is also processed by taught thresholds evaluation 1050. If the thresholds are determined, in a decision point 1054, to not be within taught limits, the thresholds are updated in a step 1051. Otherwise, if the thresholds are determined, in the decision point 1054, to be within taught limits, the state of the light (e.g., whether a signal from the paired emitter is detected) is checked in a step 1040. Noise level output, signal level(s) output, or a combination thereof from frequency analysis step 1010 are also processed by signal validation threshold calculation step 1025. A minimum valid threshold is determined therefrom. Validation step 1030 evaluates the signal level(s) from frequency analysis step 1010 according to the minimum valid threshold value(s) generated by step 1025. If the signal is determined, in a decision point 1035, to not be valid, the output is set 1065 accordingly (e.g., no signal).

If the signal is determined to be valid in the decision point 1035, the light state is checked in a step 1040. If a light state is determined to not exist (e.g., the light is detected as "off"), in a decision point 1045, then the method 1000 returns to the step 1040. If a light state is determined to exist (e.g., the light is detected as "on"), in the decision point 1045, the demodulation step 1055 occurs. The demodulated signal is checked again to determine, in a decision point 1060, if the light state is detected. Depending on the answer, the output is set accordingly in a step 1065. In various embodiments, one or more paired sensor sets may, for example, advantageously set an output (e.g., a binary "ON" or "OFF" signal) indicating whether the emitter signal is detected or not, even when used in optically noisy environments.

Although various embodiments have been described with reference to the figures, other embodiments are possible. For example, in various embodiments, a signal processing circuit may be taught a received signal level such as, for example, using at least one known paired emitter source, one or more predetermined noise sources, or some combination thereof. In an exemplary embodiment, during a teaching operation the device may measure the received signal at the time of teaching and set at least one threshold based on one or more measured signal levels (e.g., in the frequency domain). By way of example and not limitation, the teaching mode may use known signal sources to determine a taught threshold.

In various embodiments, received signal level may be tracked. For example, during run time, a low pass filter may be applied to one or more current frequency amplitude measurements. One or more thresholds may be dynamically adjusted based on the measurements to, for example, compensate for varying environmental contamination. Various such embodiments may, for example, be used after a teaching mode is completed to advantageously track slow deviations over time, while ignoring anomalies that occur quickly and less often and focusing on changes that may occur in the emitter signal.

In various embodiments, dynamic threshold selection may be performed based on a ratio between two predetermined emitter drive frequencies. For example, because a ratio between a predetermined main emitter drive frequency and a predetermined sub frequency will be constant for a valid emitter signal, the ratio of the energy content at these two frequencies may be used, for example, to increase the signal threshold and help to further reject interfering signals. By way of example and not limitation, if a very strong frequency is measured at the main frequency, the threshold on the sub frequency signal can be raised, or vice versa. Various such embodiments may, for example, advantageously assist to reject low frequency noise source(s) that alias to higher frequencies.

In various embodiments, dynamic demodulation may be performed based on measured signal to noise. For example, when both the signal from a paired emitter and a noise source are present, the output may become unstable if the noise source is much stronger than the emitter. This may be solved, for example, by increasing the number of samples required before changing the output state (e.g., paired emitter light detected or undetected) if the measured noise is large relative to the measured signal. A mathematical mechanism to determine the noise level, such as discussed in relation to a teaching mode, above, may, for example, be used to determine the noise level present in the signal. The output of the frequency analysis may be used to detect the signal level. By way of example and not limitation, methods and portions thereof taught in U.S. Pat. No. 9,507,049 issued to John Alyn Stecker, Keith Donald Carlsten, and David Steven Anderson on Nov. 29, 2016, incorporated herein by reference in its entirety, may be implemented in various embodiments. Various such embodiments may, for example, implement noise detection methods taught therein using numeric methods in digital signal processing circuitry, rather than as a fixed comparator threshold, and may employ signal strength as an additional criterion before additional demodulation is added.

In various embodiments, the emitter and receiver may be synchronized. By way of example and not limitation, the receiver may be triggered to initiate signal detection when the emitter begins emitting, the emitter and receiver may be configured with a predetermined time schedule, other appropriate synchronization, or some combination thereof. In various embodiments, the emitter and receiver may be asynchronous. By way of example and not limitation, the receiver may repeatedly or even continuously detect and process received signals without regard to the state of the emitter.

In various embodiments, frequency analysis may, by way of example and not limitation, be performed using dedicated circuits, integrated circuits, programmable circuits, or some combination thereof. For example, frequency analysis may include one or more steps during digital signal processing, may include one or more stages in an analog signal processing circuit, or some combination thereof. Frequency analysis, by way of example and not limitation, may include mathematical transformations (e.g., Fourier and Goertzel), digital filtering, analog filtering, or some combination thereof.

Although various exemplary embodiments herein have been described in the context of a main drive frequency and sub drive frequency, other configurations are contemplated. By way of example and not limitation, one drive frequency may be used, two drive frequencies may be used, or three or more distinct drive frequencies may be used. For example, in some embodiments adjacent sensors may share one drive frequency but may have one or more additional configurable drive frequencies. In some embodiments, all drive frequencies may be configurable. In various embodiments, one or more drive frequencies may be manually configurable, may be automatically configurable (e.g., in a teaching mode or dynamically), or some combination thereof. In various embodiments, the number of drive frequencies used may be predetermined, manually determined (e.g., during setup), or automatically determined (e.g., in a teaching mode or dynamically). For example, in some automatic embodiments, one or more appropriate drive frequencies may be added, adjusted, or both based on, for example, intended signal level(s), noise level(s), or some combination thereof.

In various embodiments, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an exemplary system has been described with reference to the various figures, other implementations may be deployed in other industrial, scientific, medical, commercial, and/or residential applications.

Temporary auxiliary energy inputs may be received, for example, from chargeable or single use batteries, which may enable use in portable or remote applications. Some embodiments may operate with other DC voltage sources, such as a 9V (nominal) batteries, for example. Alternating current (AC) inputs, which may be provided, for example from a 50/60 Hz power port, or from a portable electric generator, may be received via a rectifier and appropriate scaling.

Provision for AC (e.g., sine wave, square wave, triangular wave) inputs may include a line frequency transformer to provide voltage step-up, voltage step-down, and/or isolation.

Although an example of a system, which may be portable, has been described with reference to the above figures, other implementations may be deployed in other processing applications, such as desktop and networked environments.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier (e.g., in a machine-readable storage device), for execution by a programmable processor; and methods can be performed by a programmable processor executing a program of instructions to perform functions of the invention by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. The invention may be implemented in a computer system that includes a graphical user interface and/or an Internet browser. To provide for interaction with a user, some implementations may be implemented on a computer having a display device (e.g., CRT (cathode ray tube), LCD (liquid crystal display), LED (light emitting diode)) such as a monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

In an illustrative aspect, a method may be provided for identifying a unique emitter signal in a noisy environment including: emitting from a first emitter an optical signal having at least one predetermined frequency; receiving the optical signal at a first receiver and generating a corresponding digital signal; generating a spectral profile of the digital signal; applying a first threshold to the spectral profile; and generating an output signal based on the presence of an amplitude of the spectral profile above the first threshold at the at least one predetermined frequency. The at least one predetermined frequency may include a first predetermined frequency and a second predetermined frequency. The method may include applying a second threshold to the spectral profile. The second threshold may be lower than the first threshold. The output signal may be generated based on the presence of an amplitude of the spectral profile above the first threshold at the first predetermined frequency and above the second threshold at the second predetermined frequency.

The method may include measuring amplitude of the spectral profile of the received signal during a teaching operation when the first emitter is on and when the first emitter is off and setting at least the first threshold between an amplitude of the spectral profile at the at least one predetermined frequency when the first emitter is on and when the first emitter is off. The method may include generating a total spectral energy profile of the digital signal, and dynamically altering the at least one threshold according to the total spectral energy profile. The method may include dynamically altering the at least one threshold according to a predetermined ratio between the first predetermined frequency and the second predetermined frequency. The method may include dynamically altering a number of demodulation samples used to generate the output according to a ratio between the amplitude at least at the first predetermined frequency and amplitude at one or more other frequencies.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An automated system comprising:
a transportation system configured to transport an object from one location to another location; and,
a self-linking optical sensor coupled to the transportation system, wherein the self-linking optical sensor comprises:
an optical receiver configured to receive, from an emitter, an emitted optical signal modulated by at least one predetermined frequency comprising a first predetermined frequency and a second predetermined frequency, and generate a digital signal corresponding to the optical signal received; and, a controller operably coupled to the optical receiver and configured to generate, from the digital signal, a spectral profile of the digital signal, to apply a first predetermined threshold to the spectral profile, and to generate an output signal based on a presence of an amplitude of the spectral profile above the first predetermined threshold at the at least one predetermined frequency.

2. The automated system of claim 1, wherein the transportation system comprises a conveyor belt.

3. The automated system of claim 1, embodied in a jam detecting device of a baggage conveyor system.

4. The automated system of claim 1, embodied in a printing system, wherein the output signal is configured to trigger a printing operation on the object.

5. The automated system of claim 1, embodied in an object counting system configured to detect a presence of the object.

* * * * *